United States Patent
Damjanovic et al.

(10) Patent No.: US 9,975,814 B2
(45) Date of Patent: May 22, 2018

(54) FIBER-REINFORCED SILICON CARBIDE COMPOSITE MATERIALS, METHOD FOR PRODUCING THE FIBER-REINFORCED SILICON CARBIDE COMPOSITE MATERIALS, AND USES OF THE FIBER-REINFORCED SILICON CARBIDE COMPOSITE MATERIALS

(71) Applicant: SGL CARBON SE, Wiesbaden (DE)

(72) Inventors: Tanja Damjanovic, Meitingen (DE);
Andreas Kienzle, Meitingen (DE);
Ingrid Kraetschmer, Meitingen (DE)

(73) Assignee: SGL Carbon SE, Wiesbaden (DE)

( * ) Notice: Subject to any disclaimer, the term of this patent is extended or adjusted under 35 U.S.C. 154(b) by 706 days.

(21) Appl. No.: 14/450,444

(22) Filed: Aug. 4, 2014

(65) Prior Publication Data
US 2014/0339718 A1    Nov. 20, 2014

Related U.S. Application Data

(63) Continuation of application No. PCT/EP2013/052185, filed on Feb. 4, 2013.

(30) Foreign Application Priority Data

Feb. 3, 2012    (DE) .................. 10 2012 201 648

(51) Int. Cl.
C04B 35/76        (2006.01)
C04B 35/577       (2006.01)
(Continued)

(52) U.S. Cl.
CPC ............ *C04B 35/76* (2013.01); *C04B 35/522* (2013.01); *C04B 35/573* (2013.01); *C04B 35/62635* (2013.01); *C04B 35/62873* (2013.01); *C04B 35/63476* (2013.01); *C04B 35/806* (2013.01); *C04B 35/83* (2013.01); *E05G 1/024* (2013.01); *F41H 1/02* (2013.01); *F41H 5/0428* (2013.01); *F41H 7/00* (2013.01); *C04B 2235/3826* (2013.01); *C04B 2235/422* (2013.01); *C04B 2235/526* (2013.01); *C04B 2235/528* (2013.01);
(Continued)

(58) Field of Classification Search
CPC ......... C04B 35/573; C04B 35/76; F41H 1/02; F41H 7/00
See application file for complete search history.

(56) References Cited

U.S. PATENT DOCUMENTS

| 5,939,216 A | 8/1999 | Kameda et al. |
|---|---|---|
| 5,955,391 A | 9/1999 | Kameda et al. |

(Continued)

FOREIGN PATENT DOCUMENTS

| EP | 1098161 B1 | 7/2006 |
|---|---|---|
| EP | 1845074 A1 | 10/2007 |

*Primary Examiner* — Karl E Group
(74) *Attorney, Agent, or Firm* — Laurence A. Greenberg; Werner H. Sterner; Ralph E. Locher

(57) ABSTRACT

Silicon carbide composite materials contain CSiC with a density of 2.95 to 3.05 $g/cm^{-3}$ and a fiber bundle content of 2 to 10 wt. %. The fiber bundles have a length of 6 to 20 mm, a width of 0.2 to 3 mm, and a thickness of 0.1 to 0.8 mm. The fiber bundles are filled with a cured phenolic resin content of up to 45 wt. %, and the protected fiber bundles are integrated into an SiC matrix. A method produces the silicon carbide composite materials.

14 Claims, 1 Drawing Sheet

(51) Int. Cl.
  *F41H 5/00* (2006.01)
  *C04B 35/52* (2006.01)
  *C04B 35/573* (2006.01)
  *C04B 35/626* (2006.01)
  *C04B 35/628* (2006.01)
  *C04B 35/634* (2006.01)
  *C04B 35/80* (2006.01)
  *C04B 35/83* (2006.01)
  *F41H 5/04* (2006.01)
  *E05G 1/024* (2006.01)
  *F41H 1/02* (2006.01)
  *F41H 7/00* (2006.01)

(52) U.S. Cl.
  CPC ............ *C04B 2235/5212* (2013.01); *C04B 2235/5248* (2013.01); *C04B 2235/5264* (2013.01); *C04B 2235/5436* (2013.01); *C04B 2235/5472* (2013.01); *C04B 2235/604* (2013.01); *C04B 2235/612* (2013.01); *C04B 2235/616* (2013.01); *C04B 2235/6567* (2013.01); *C04B 2235/77* (2013.01); *C04B 2235/775* (2013.01)

(56) References Cited

U.S. PATENT DOCUMENTS

| | | | |
|---|---|---|---|
| 6,537,654 | B1 | 3/2003 | Gruber et al. |
| 6,709,736 | B2 | 3/2004 | Gruber et al. |
| 6,919,127 | B2 * | 7/2005 | Waggoner ............ C04B 35/565 428/294.4 |
| 8,357,320 | B2 | 1/2013 | Kienzle et al. |
| 8,603,374 | B2 * | 12/2013 | Domagalski ............ C08J 5/04 264/109 |
| 9,005,732 | B2 * | 4/2015 | Kienzle ............ C04B 35/573 428/141 |
| 2002/0142146 | A1 | 10/2002 | Gadow et al. |
| 2007/0237954 | A1 * | 10/2007 | Kienzle ............ C04B 35/573 428/375 |

* cited by examiner

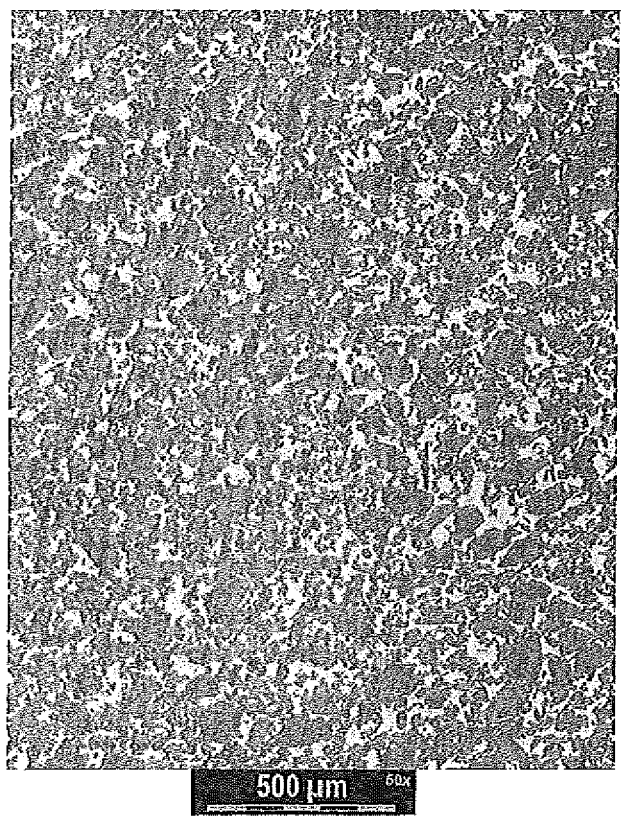

FIBER-REINFORCED SILICON CARBIDE COMPOSITE MATERIALS, METHOD FOR PRODUCING THE FIBER-REINFORCED SILICON CARBIDE COMPOSITE MATERIALS, AND USES OF THE FIBER-REINFORCED SILICON CARBIDE COMPOSITE MATERIALS

CROSS-REFERENCE TO RELATED APPLICATION

This is a continuation application, under 35 U.S.C. § 120, of copending international application PCT/EP2013/052185, filed Feb. 4, 2013, which designated the United States; this application also claims the priority, under 35 U.S.C. § 119, of German patent application DE 10 2012 201 648.1, filed Feb. 3, 2102; the prior applications are herewith incorporated by reference in their entireties.

BACKGROUND OF THE INVENTION

Field of the Invention

The present invention relates to fiber-reinforced silicon carbide (SiC) composite materials and to a method for producing such fiber-reinforced silicon carbide composite materials.

The use of ceramics as an armour system is known.

When a projectile is fired into armour plating made from conventional ceramic, the propagation of the shock waves within the ceramic panel causes the ceramic panel itself to break. The projectile can only be prevented from passing right through the armour plating completely because the ceramic is backed by another material layer, made from metal, for example.

When ceramic is used for armour plating, it is imperative that it is significantly harder than the material of the projectile, which usually has a Vickers hardness from about 6.5 to 8.0 kN/mm². Accordingly, it would be favorable to use materials with a hardness greater than 9.8 kN/mm². If the ceramic is too soft, the core of the projectile passes through the ceramic because it is not damaged by the ceramic.

However, it is possible to make ammunition considerably harder, for example by using a tungsten carbide core covered with a nickel-iron matrix. In such a case, the hardness may be increased to about 11 kN/mm², for example. Ceramic materials consisting of silicon carbide are considerably harder and can withstand such a projectile.

More recently, fiber-reinforced composite materials with a ceramic matrix are now also being used instead of conventional ceramics as protection from projectiles. It has been shown that these materials suffer only limited damage from the impact of a projectile, and accordingly that the composite material offers effective protection against multiple shots from an automatic weapon (multi-hit). However, the protection it offers from projectiles is rather low compared with the known ceramics.

Fiber-reinforced composite materials with a ceramic matrix are generally noteworthy for the combined qualities they possess of strength and stiffness with low weight. These properties are retained even at high temperatures. Fiber-reinforced composite materials are very good conductors of heat with low thermal expansion, resulting in outstanding resistance to thermal shock.

Starting with carbon fiber-reinforced composite materials with a carbon matrix, more and more composite materials are being developed with SiC as the matrix, wherein carbon fibers (C/SiC) and silicon carbide fibers (SiC/SiC) are used as the reinforcing fibers.

At present, protective panels or protective elements are being produced that are based technologically on sintered SiC, hot-pressed SiC, SiSiC and LPS SiC (liquid phase sintered silicon carbide). Limitations in the production of thicker panels and complex geometries represent a disadvantage associated with these manufacturing processes.

European patent EP1098161 B1 (corresponding to U.S. Pat. Nos. 6,709,736 and 6,537,654) describes a composite material formed of a metal or woven fabric backing and an at least 2.4 mm thick panel of a fiber-reinforced ceramic material with a matrix containing 55 to 80% by weight silicon carbide, 10 to 40% by weight carbon, and 2 to 20% by weight silicon relative to the total mass of the composite material, wherein the percentage of fiber in the composite material is 8 to 30% by weight of the total weight. The average length of the reinforcing fibers is 0.5 to 5 mm, and the fibers are coated with at least one layer of graphitized carbon.

The relatively high percentage of fiber content has the effect of increasing the multi-hit capability, but at the same time lowers ballistic performance, thereby reducing the protective effect. Ballistic protective devices contain a combination of the fiber-reinforced ceramic material and a backing.

In conventional silicon carbide composite materials that do not have a carbon fiber component, it has been found that panel structures are destroyed, particularly in the area around the bullet hole. In order to avoid this problem, panels are constructed from a plurality of small segments. In order to minimize the size of the gaps between the individual segments, they must be worked very precisely and stuck onto a carrier structure in an extremely time-consuming process. When struck with a projectile, only individual segments are destroyed, so damage is limited spatially and multi-hit performance is achieved. With the conventional ceramic technologies, production of thick, heavy and rigid panels is difficult if not completely impossible. It is also extraordinarily difficult to make complex geometries based on monolithic ceramic.

SUMMARY OF THE INVENTION

In view of the state of the prior art as described in the preceding, it is the object of the present invention to produce ceramic components having multi-hit capability that also have significantly improved ballistic protection performance, and greater homogeneity than the known components in terms of the properties thereof, in particular smaller density variations and less shrinkage, particularly when such components are relatively large and have a complex or complicated shape.

The object is solved particularly by the addition of a small quantity of specially protected carbon fiber bundles having a defined geometry, wherein the carbon fiber bundles are distributed evenly throughout a high-density SiC matrix.

Other features which are considered as characteristic for the invention are set forth in the appended claims.

Although the invention is illustrated and described herein as embodied in fiber-reinforced silicon carbide composite materials, a method for producing the fiber-reinforced silicon carbide composite materials, and uses of the fiber-reinforced silicon carbide composite materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is an illustration of a finished surface of a material according to the invention.

DETAILED DESCRIPTION OF THE INVENTION

A defined geometry of fiber bundles used is essentially cuboid, preferably cuboid, so that it may be specified in terms of its length, width and thickness. The geometry may differ from that of a perfect cuboid, that is to say the exact mathematical definition of the right-angle present in a cuboid, provided it is still possible to describe the geometry of the fiber bundles in terms of length, width and thickness.

Accordingly, the silicon carbide composite materials according to the invention contain a SiC matrix and have a density of 2.95 to 3.05 g/cm$^3$, wherein the starting materials for manufacturing the silicon carbide composite materials contain 0.5 to 10% by weight fiber bundles impregnated with phenolic resin relative to the total weight of the starter substances. The fiber bundles have a length from 6 to 20 mm, a width from 0.2 to 3 mm and thickness from 0.1 to 0.8 mm and wherein the fiber bundles have a percentage of cured phenolic resin of up to 45% by weight.

The range parameters for length, width and height of the fiber bundles are not average values of a length or width or thickness distribution. Rather, fiber bundles having a defined geometry that lies within the range parameters are used.

The indicated proportion by weight of the fiber bundles from 0.5 to 10% by weight refers according to the invention to the starting materials used to make the green bodies. These are defined and described in greater detail in the following (see process step a). Accordingly, the starting materials do not include the material that is infiltrated during silicating or the resin that may have been infiltrated after the pressing process. A weight percentage of the fiber bundles is preferably from 1.5 to 10% by weight, more preferably from 2 to 10% by weight.

Thus, the fiber bundle impregnated with phenolic resin that is used is a fiber-reinforced plastic, in the preferred case of carbon fibers a carbon fiber reinforced plastic (CFRP). In contrast to this, the prior art makes use of carbonized fiber bundles, wherein the resin originally present was converted into carbon by heat treatment, giving rise to a fiber-reinforced carbon, for example a carbon fiber-reinforced carbon (CFRC).

The fiber bundles preferably have a length from 8 to 12 mm, a width from 0.5 to 2 mm, more preferably a width from 0.5 to 1 mm and a thickness from 0.2 to 0.7 mm, more preferably a thickness from 0.2 to 0.5 mm.

An organic polymer such as polyacrylonitrile may also be used as the starter substance for the fibers.

Other fibers with a base of silicon, carbon, boron, nitrogen, aluminum or mixtures thereof may also be used as fibers as well as carbon and graphite fibers.

In all cases, the selection of the fibers should be guided by the requirement that such fibers must be able to withstand temperatures up to at least 1600° C., so that they are not immediately damaged during infiltration with molten materials. Conventional materials do not have any fiber protection (sheath), with the result that, for example, unprotected carbon fibers are attacked during the infiltration with silicon, and it is not possible to obtain a ductile material. The fibers used according to the invention therefore advantageously have a protective coating. The coating preferably contains at least one layer of carbon or graphite, which is/are created by carbonizing for example plastic resins and/or other carbon donors, and optionally subsequent graphitizing.

It is preferred that the SiC matrix contain SiC powder with a granularity of F150 and/or F360, as well and also carbonized cellulose fiber and/or acetylene coke and/or charcoal and/or phenolic resin in liquid and/or powder form as raw materials. The designation for the grain size is based on the FEPA Standard of the Federation of European Producers of Abrasives.

Given the outstanding resistance to breakage of the components, it is not absolutely essential to provide the elements according to the invention with reinforcement on the rear, wherein the reinforcing element (backing) is glued to the rear of the composite materials to create a bulletproof protective panel. Instead, the composite body may already incorporate this protective panel in itself, which is to say without backing. All the same, the thickness of a component made from a material according to the invention but without backing is still greater and with the same effect than that of a ceramic panel with backing.

A further object of the present invention is a method for manufacturing silicon carbide composite materials. The method includes the steps of:

a) mixing/blending resin and fiber bundles impregnated with phenolic resin and cured and containing a proportion of phenolic resin of up to 45% by weight and having a length from 6 to 20 mm, a width from 0.2 to 3 mm and a thickness from 0.1 to 0.8 mm, wherein the proportion of fiber bundles in the step a) is 0.5 to 10% relative to the total weight of the starter substances, and additionally charcoal (preferably with a medium grain size) or additionally acetylene coke or additionally SiC powder in grain sizes F150 and/or F360 or additionally Abrocarb or additionally SiC powder in grain sizes F150 and/or F360 and Abrocarb or additionally SiC powder in grain sizes F150 and/or F360, Abrocarb and acetylene coke;

b) compacting in a mold under high pressure and temperature;

c) optionally, impregnating with a liquid phenolic resin in an autoclave under high pressure and temperature;

d) carbonizing under a shielding gas in a temperature range from 850 to 950° C.;

e) optionally, graphitizing under a shielding gas in a temperature range from 1850 to 2100° C.;

f) optionally, machining the material thus obtained and milling out components with complex geometries; and g) silicating in a vacuum in a temperature range from 1600 to 1750° C. and a dwell time of 60 to 90 minutes.

In the method according to the invention, a step of impregnating with a liquid phenolic resin in an autoclave under high pressure and temperature (step c) is preferably carried out between steps b) and d).

In the method according to the invention, a step of graphitizing under a shielding gas in a temperature range from 1850 to 2100° C. (step e) is preferably carried out between steps d) and f).

The resin in step a) preferably contains a phenolic resin. Phenolic resin is preferred because a large amount of carbon residue is left behind after carbonizing than with other resins, so more SiC is obtained in the silicating step, which ultimately results in increased stability of the material.

"CC3 green" is preferably used as the fiber bundle in step a). CC3 green is the term used to designate a carbon fiber bundle impregnated with phenolic resin, having a phenolic resin component of up to 45% by weight, and which is essentially cuboid in shape and has a length of 9.8 mm, a width of 1 mm and a thickness of 0.2-0.5 mm. The phenolic resin in the CC3 green has preferably been cured at a temperature of 180° C. The suffix "green" means that the fiber is still in the CFRP form, i.e., it has not yet been carbonized. A preferred method for producing the one suitable carbon fiber bundle is described in European patent EP 1645671 B1, corresponding to U.S. Pat. No. 8,603,374 (see examples 1 and 2 in the cited document).

One of the advantages of using the fiber bundle in the "green" state, that is to say in the CFRP state, is that it remains dimensionally stable while it is being mixed with the other starting materials and the subsequent compacting process. On the other hand, a fiber bundle that has been carbonized beforehand is less stable, and would therefore lose its original shape during the mixing and compacting process. Moreover, a carbonized fiber bundle would absorb phenolic resin again in steps a) and c), which would mean that the resulting carbon component in the fiber bundle after carbonizing (step d) would be higher. The lower carbon component in the case of the "green" fiber bundle results in improved binding of the SiC matrix and the fiber bundle during silicating. Consequently, the coefficients of expansion of the bundles and the matrix are more similar to each other, and this ultimately results in a more stable material.

The term "Abrocarb" is used to refer to a carbonized, ground cellulose fiber, in which the cellulose in question has been obtained from wood. Abrocarb is preferably free from lignin and is used as a powder with an average grain size <20 μm.

The higher pressure cited in steps b) and c) is not subject to any particular limitations. Suitable pressures are known to persons skilled in this technical field. However, the pressure is preferably 0.5 to 3 MPa, more preferably 0.5 to 2 MPa.

The higher temperature cited in steps b) and c) is not subject to any particular limitations. Suitable temperatures are known to persons skilled in this technical field and, as such persons know, in all cases they should be higher than the curing temperature of the resin being used, preferably above 110° C., more preferably 130 to 200° C., yet more preferably 150 to 180° C.

The net result of method steps a) and b) according to the invention is to product a "green body" that is carbonized and silicated, and subjected to other processing steps in subsequent steps of the method. According to the invention, the proportion of fiber bundles contained in the green body is 1.5 to 10% by weight relative to the total weight of the starting materials of the green body, that is to say the starting materials referred to in step a). The quantity of resin that may be added in step c), and the quantity of material that is added during the silicating in step g), therefore do not have to be considered when determining the proportion by weight of the fiber bundles.

The acetylene coke is preferably in the form of ball-shaped carbon with an onion skin structure, which is obtained by carbonizing acetylene.

In the silicating process in step g), other materials besides silicon are also usable as infiltration material, and are added to the silicon. In all cases, the materials used for infiltration must be capable of melting in a temperature range of up to 1800° C. Aluminum, boron, magnesium, nitrogen, carbon and compounds or mixtures thereof, and silicides may also be considered for use as infiltration materials.

It is particularly preferred if a backing of metal panels and a fabric of fibers are bonded to panel-like silicon carbide composite materials according to the invention, wherein the backing fabric is up to 15 mm thick. Such a composite is suitable for absorbing at least one percussive, dimensionally concentrated load.

The fiber-reinforced silicon carbide composite materials produced according to the present invention are suitable for use in many ballistic applications, such as body armour for civilian and military fields of operation.

A particular advantage of the use of the silicon carbide composite materials according to the invention consists in that components can be produced immediately in the shape of a desired structural component, so shaping steps after the components are made are unnecessary and it is possible to lower the cost of manufacturing body armour, for example. Consequently, and surprisingly, it is also possible to produce large, complex components with a high degree of precision and homogeneity in the manner described. At the same time, undesirable inconsistencies in the density of the component may be avoided.

It is preferred that the silicon carbide composite materials according to the invention are used for protective armour against ballistic effects or gunshots.

The silicon carbide composite materials according to the invention are also preferably used in armour cladding for automobiles, military vehicles including tanks, aircraft, helicopters, ships, railcars, spacecraft, safes and fixed-position objects. Another, more preferred application of silicon carbide composite materials according to the invention is the use thereof in bullet-proof vests.

It is precisely the high material density of the composite material produced in the method according to the invention results in a surprisingly favorable shot-resistant effect. Compared with monolithic ceramics, the fiber-reinforced ceramics according to the invention also have significantly higher fracture toughness. The mechanical impulse energy of a projectile acting on the material is absorbed via internal, energy absorbing effects in the composite body, wherein micro-cracks are induced in the areas of the matrix between the fibers, and these micro-cracks gradually absorb the energy of the shots. This causes the projectiles to be flattened as they strike the material, thereby decelerating the shot and converting the kinetic energy into energy for crack formation.

Another application makes advantageous use of the ability of the composite material surfaces to retain a high polish due to the high material density. In this context, it is provided to use the composite material for satellite mirrors, for example.

Because of its high strength, rigidity and resistance to wear, the composite material according to the invention may also be used directly as a structural component in machine components that are subject to exceptional stresses.

TABLE I

Overview of the experiments performed

| Components | Experiment 1 [% by wgt.] | Experiment 2 [% by wgt.] | Experiment 3 [% by wgt.] | Experiment 4 [% by wgt.] | Experiment 5 [% by wgt.] | Experiment 6 [% by wgt.] |
| --- | --- | --- | --- | --- | --- | --- |
| Resin | 7.4 | 20.0 | 20.0 | 20.0 | 29.5 | 38.4 |
| Charcoal | 4.6 | | | | | |

TABLE I-continued

Overview of the experiments performed

| Components | Experiment 1 [% by wgt.] | Experiment 2 [% by wgt.] | Experiment 3 [% by wgt.] | Experiment 4 [% by wgt.] | Experiment 5 [% by wgt.] | Experiment 6 [% by wgt.] |
|---|---|---|---|---|---|---|
| SiC F150 | 43.1 | 37.2 | 35.6 | 34.9 | | |
| SiC F360 | 43.1 | 37.2 | 35.6 | 34.9 | | |
| CC3 green | 1.9 | 1.6 | 5.0 | 1.5 | 1.6 | 1.6 |
| Abrocarb | | 4.0 | 3.8 | 3.7 | | 60.0 |
| Acetylene Coke | | | | | 5.0 | 68.9 |

Experiment 1

The proportions of resin (Norsophen 1203), charcoal, SiC F150, SiC F360 and CC3 (in the CFRP state: 1 mm wide, 9.6 mm long and 0.4 mm thick) were mixed in a kneader for an hour in the proportions shown in Table 1. The molding material homogenized in this way is removed from the mixed and compacted. For a 550 mm×550 mm×60 mm panel, 39 kg of the mixture is weighed into a compacting mold and compacted under a pressure of 2 MPa and at a temperature of 170° C. In order to complete the curing, the panel is kept at the same pressure and temperature in the press for 2 hours. After demolding, the cured CFRP panel (with a density of 1.8 g/cm$^3$) is impregnated with a liquid phenolic resin under vacuum and pressure in an autoclave. The panel treated in this way is then heated to temperature of 900° C. in a protective gas atmosphere. This step converts the phenolic resin to carbon. The resulting panel is then annealed at a temperature of 2000° C. in a protective gas. Then, the panel is machined and milled to create components with complex geometry. These components are promptly passed to a graphite crucible and silicated together with a corresponding quantity of silicon in a vacuum at a temperature of 1680° C. and for a dwell time of 75 minutes. After cooling, the component is removed from the crucible. In this process, the component has absorbed an additional quantity of silicon equal to 80% of its own weight and converted a portion of it into SiC. The density of the component after silicating is 2.99 g/cm$^3$.

Experiment 2

The proportions of resin (Bakelite, resin powder), carbonized, ground cellulose fibers (10 μm fiber length), SiC F150, SiC F360 and CC3 (in the CRFP state: 1 mm wide, 9.6 mm long and 0.4 mm thick) shown in Table 1 were mixed in a high-speed mixer for a period of 10 minutes at a speed of 220 rpm. The dried, homogenized molding material obtained in this way was removed from the mixer and compacted. For a 550 mm×550 mm×60 mm panel, 39 kg of the mixture were weighed out and compacted at a pressure of 0.5 MPa and a temperature of 170° C. In order to complete the curing, the panel is kept at the same pressure and temperature in the press for 2 hours. The cured panel is then heated to a temperature of 900° C. in a protective gas atmosphere. This step converts the phenolic resin to carbon. The panel is then machined and milled to create components with complex geometry. These components are promptly passed to a graphite crucible and silicated together with a corresponding quantity of silicon in a vacuum at a temperature of 1680° C. and for a dwell time of 75 minutes. After cooling, the component is removed from the crucible. In this process, the component has absorbed an additional quantity of silicon equal to 80% of its own weight and converted a portion of it into SiC. The density of the component after silicating is 3.05 g/cm$^3$.

Experiment 3

The proportions of resin (Bakelite, resin powder), carbonized, ground cellulose fibers (10 μm fiber length), SiC F150, SiC F360 and CC3 (in the CRFP state: 1 mm wide, 9.6 mm long and 0.4 mm thick) shown in Table 1 were mixed in a high-speed mixer for a period of 10 minutes at a speed of 400 rpm. The dried, homogenized molding material obtained in this way was removed from the mixer and compacted. For a 550 mm×550 mm×60 mm panel, 36 kg of the mixture were weighed into a mould and compacted at a pressure of 0.5 MPa and a temperature of 170° C. In order to complete the curing, the panel is kept at the same pressure and temperature in the press for 2 hours. The cured panel is then heated to a temperature of 900° C. in a protective gas atmosphere. This step converts the phenolic resin to carbon. The panel is then machined and milled to create components with complex geometry. These components are promptly passed to a graphite crucible and silicated together with a corresponding quantity of silicon in a vacuum at a temperature of 1680° C. and for a dwell time of 75 minutes. After cooling, the component is removed from the crucible. In this process, the component has absorbed an additional quantity of silicon equal to 80% of its own weight and a portion of it has been converted with the carbon into SiC. The density of the component after silicating is 2.95 g/cm$^3$.

Experiment 4

The proportions of resin (Bakelite, resin powder), carbonized, ground cellulose fibers (10 μm fiber length), SiC F150, SiC F360 and CC3 (in the CRFP state: 1 mm wide, 9.6 mm long and 0.4 mm thick) and acetylene coke (with a grain size of 0-500 μm) shown in Table 1 were mixed in a high-speed mixer for a period of 10 minutes at a speed of 400 rpm. The dried, homogenized molding material obtained in this way was removed from the mixer and compacted. For a 550 mm×550 mm×60 mm panel, 39 kg of the mixture were weighed into a mold and compacted at a pressure of 0.5 MPa and a temperature of 170° C. In order to complete the curing, the panel is kept at the same pressure and temperature in the press for 2 hours. The panel is then heated to a temperature of 900° C. in a protective gas atmosphere. This step converts the phenolic resin to carbon. The panel is then machined and milled to create components with complex geometry. These components are promptly passed to a graphite crucible and silicated together with a corresponding quantity of silicon in a vacuum at a temperature of 1680° C. and for a dwell time of 75 minutes. After cooling, the component is removed from the crucible. In this process, the component has absorbed an additional quantity of silicon equal to 80% of its own weight and a portion of it has been converted with the carbon into SiC. The density of the component after silicating is 2.97 g/cm$^3$.

Experiment 5

The proportions of resin (Bakelite, resin powder), carbonized, ground cellulose fibers (10 μm fiber length), CC3 (in the CRFP state: 1 mm wide, 9.6 mm long and 0.4 mm thick) and acetylene coke (with a grain size of 0-500 μm) shown in Table 1 were mixed in a high-speed mixer for a period of 10 minutes at a speed of 1600 rpm. The dried, homogenized molding material obtained in this way was removed from the mixer and compacted. For a 550 mm×550 mm×60 mm panel, 20 kg of the mixture are transferred to a mould and compacted at a pressure of 1.0 MPa and a temperature of 170° C. In order to complete the curing, the panel is kept at the same pressure and temperature in the press for 2 hours. The panel is then heated to a temperature of 900° C. in a protective gas atmosphere. This step converts the phenolic resin to carbon. The panel is then machined. These machined components are then passed to a graphite crucible and heated together with silicon in a vacuum to a temperature of 1680° C. and for a dwell time of 75 minutes. After cooling, the component is removed from the crucible. In this process, the component has absorbed an additional quantity of silicon equal to 110% of its own weight and a portion of it has been converted with the carbon into SiC. The density of the component after silicating is 3.02 g/cm$^3$.

Experiment 6

The proportions of resin (Bakelite, resin powder), CC3 (in the CRFP state: 1 mm wide, 9.6 mm long and 0.4 mm thick) and carbonized ground cellulose fibers (fiber length 10 µm) shown in Table 1 were mixed in a high-speed mixer for a period of 10 minutes at a speed of 1400 rpm. The dried, homogenized molding material obtained in this way was removed from the mixer and compacted. For a 550 mm×550 mm×60 mm panel, 18 kg of the mixture were transferred into a mold and compacted at a pressure of 1.0 MPa and a temperature of 170° C. In order to complete the curing, the panel is kept at the same pressure and temperature in the press for 2 hours. The panel is then heated to a temperature of 900° C. in a protective gas atmosphere. This step converts the phenolic resin to carbon. The panel is then machined. These machined components are then passed to a graphite crucible and silicated together with a corresponding quantity of silicon in a vacuum at a temperature of 1680° C. and for a dwell time of 75 minutes. After cooling, the component is removed from the crucible. In this process, the component has absorbed an additional quantity of silicon equal to 110% of its own weight and a portion of it has been converted with the carbon into SiC. The density of the component after silicating is 3.01 g/cm$^3$.

The invention claimed is:

1. A silicon carbide composite material having a density from 2.95 to 3.05 g/cm$^3$, comprising:
   a SiC matrix;
   starting materials including fiber bundles impregnated with phenolic resin with a proportion of 0.5 to 10% by weight relative to a total weight of said starting materials used for a manufacture of green bodies, said fiber bundles having a length of 6 to 20 mm, a width of 0.2 to 3 mm and a thickness of 0.1 to 0.8 mm, and said fiber bundles used for manufacture of said green bodies contain a proportion of cured phenolic resin of up to 45% by weight; and
   the silicon carbide composite material containing said SiC matrix and said starting materials being formed into protective armor for use in ballistic applications.

2. The silicon carbide composite materials according to claim 1, wherein said fiber bundles have said length of 8 to 12 mm, said width of 0.5 to 2 mm and said thickness of 0.2 to 0.7 mm.

3. The silicon carbide composite materials according to claim 1, wherein said fiber bundles have said length of 8 to 12 mm, said width of 0.5 to 1 mm and said thickness of 0.2 to 0.5 mm.

4. The silicon carbide composite materials according to claim 1, wherein said SiC matrix contains as starting materials which are mixed together:
   a SiC powder with a granularity of F150 and/or F360;
   a carbonized cellulose fiber; and
   at least one further raw material selected from the group consisting of acetylene coke, charcoal, a further phenolic resin in liquid form and a further phenolic resin in powder form.

5. A method for producing silicon carbide composite materials having a density from 2.95 to 3.05 g/cm$^3$, which comprises the steps of:
   a) mixing/blending resin and fiber bundles impregnated with a phenolic resin and cured and containing a proportion of the phenolic resin of up to 45% by weight and having a length from 6 to 20 mm, a width from 0.2 to 3 mm and a thickness from 0.1 to 0.8 mm, a proportion of the fiber bundles in the step a) is 0.5 to 10% relative to a total weight of starter substances, and additionally at least one further material mixture selected from the group consisting of charcoal, acetylene coke, SiC powder in grain sizes F150 and/or F360, Abrocarb, SiC powder in grain sizes F150 and/or F360 and Abrocarb, SiC powder in grain sizes F150 and/or F360, and Abrocarb and acetylene coke;
   b) compacting in a mold under high pressure and temperature;
   c) carbonizing under a shielding gas in a temperature range from 850 to 950° C.;
   d) forming material thus obtained into protective armor for use in ballistic applications;
   e) silicating in a vacuum in a temperature range from 1600 to 1750° C. and a dwell time of 60 to 90 minutes.

6. The method for producing silicon carbide composite materials according to claim 5, which further comprises:
   f) impregnating with a liquid phenolic resin in an autoclave under high pressure and temperature;
   g) graphitizing under the shielding gas in a temperature range from 1850 to 2100° C.; and
   h) machining and milling out the material thus obtained into the protective armor.

7. The method for producing silicon carbide composite materials according to claim 5, which further comprises graphitizing under a shielding gas in a temperature range from 1850 to 2100° C.

8. The method for producing silicon carbide composite materials according to claim 5, which further comprises impregnating with a liquid phenolic resin in an autoclave under high pressure and temperature.

9. The method for producing silicon carbide composite materials according to claim 5, which further comprises providing a backing selected from the group consisting of metal panels and woven fabric of fibers, the backing being stuck to panel-shaped silicon carbide composite materials, and the backing can be up to 15 mm thick.

10. The method for producing silicon carbide composite materials according to claim 5, wherein the charcoal has a medium grain size.

11. The method for producing silicon carbide composite materials according to claim 5, which further comprises producing components directly in a shape of a desired structural component.

12. A method of forming components, which comprises the steps of:

forming a silicon carbide composite material having a density from 2.95 to 3.05 g/cm$^3$ and containing a SiC matrix and starting materials including fiber bundles impregnated with phenolic resin with a proportion of 0.5 to 10% by weight relative to a total weight of the starting materials used for a manufacture of green bodies, the fiber bundles having a length of 6 to 20 mm, a width of 0.2 to 3 mm and a thickness of 0.1 to 0.8 mm, and the fiber bundles used for manufacture of the green bodies contain a proportion of cured phenolic resin of up to 45% by weight; and producing a protective armour for use against ballistic effects or gunshots from the silicon carbide composite material.

13. The method according to claim 12, which further comprises modifying the protective armour for automobiles, military vehicles, tanks, aircraft, helicopters, ships, railcars, spacecraft, safes and fixed-position objects.

14. The method according to claim 12, which further comprises producing bullet-proof vests which include the protective armour.

* * * * *